Patented Apr. 11, 1939

2,154,231

UNITED STATES PATENT OFFICE 2,154,231

COMPOSITION OF MATTER FOR THE PREPARATION OF FIRE EXTINGUISHING FOAM

Karl Daimler and Max Paquin, Frankfort-on-the-Main, and Walter Riedelsberger, Bad Soden, Germany, assignors to I. G. Farbenindustrie Aktiengesellschaft, Frankfort-on-the-Main, Germany No Drawing. Application August 2, 1935, Serial No. 34,480. In Germany July 12, 1933

4 Claims. (Cl. 23—11)

The present invention relates to a new composition of matter for the preparation of fire-extinguishing foam.

We have found that for the production of foam there may advantageously be used an aqueous solution of a high concentration which contains albumen degradation products besides a wetting agent. This highly concentrated aqueous solution, for instance a solution of 40 to 50 per cent. strength is prepared by dissolving wetting agents in a mixture of water and a hydrophilic solvent, that is, an organic solvent capable of being mixed with water. To this solution there are added degradated forms of albumen, as they are, for instance, obtainable during the acid or alkaline treatment of albuminous substances. There are obtained highly concentrated solutions which consists of at least 13 per cent of a wetting agent of 20 per cent. and more of degradated albumen and 50 to 60% of a mixture of water and a hydrophylic solvent such as an alcohol and which are liquid at ordinary temperature and can be readily transferred by pouring; even at a temperature below the freezing point of the water these solutions yield in any desired quantity of further water a foam which is stable to heat and of a long life. The foam thus produced may, for instance, be used for fire-extinguishing purposes or for laying the dust of the mineral material. For fire-extinguishing purposes it is generally sufficient to mix a few per cent of the aforesaid mixture with water and air in order to obtain a stable foam.

As wetting agents there may, for instance, be used: the salts of alkylated aromatic sulfonic acids, such as butylated naphthalene sulfonic acid, furthermore the salts of sulfonated fatty acids or of sulfonated fatty alcohols or the salts of sulfonated resinous bodies or sulfonic acids in which the sulfo group is not linked with a fatty or resinous residue directly in the manner of an ester, ether, amide or amine by means of another organic group; furthermore bodies obtainable from fatty or resinous residues with poly-glycerin or from any organic bodies of high molecular weight and several molecules of ethylene oxide. As hydrophilic solvents are suitable, for instance, alcohols of different kinds and valencies, such as methyl alcohol or ethyl alcohol, glycol, ethyl-polyglycol, or glycerin; furthermore esters, such as ethylacetate. The hydrophilic solvents may be used either alone or in admixture with each other.

The use of the hydrophilic solvent together with the albumen degradation products for the preparation of the highly concentrated solution is necessary because the wetting agents, in general, yield in water solutions which are too viscous for use such as those described in the Jenning's Patent 1,423,719.

The following examples serve to illustrate the invention, but they are not intended to limit it thereto, the parts being by weight:

(1) A primary amine of the molecular weight of 198 to 213 obtained from palm nut oil fatty acid is treated with methyl chloride until it has a neutral reaction. 27.5 parts of this product are mixed with 25 parts of a solid albumen hydrolysate and this mixture is made up to 100 parts with water, alcohol and glycol. A solution of 1 per cent. strength of the product thus obtained yields, in one of the usual foam pumps, a foam, half of which only disappears after 24 hours.

(2) 30 parts of an albumen hydrolysate containing 50 per cent. of a dry substance are mixed with 30 parts of water, 10 parts of alcohol and 30 parts of a reaction product of ethylene oxide and castor oil. A solution of 1 per cent. strength of the foam forming substance thus obtained yields in a foam pump 6.5 times its volume of air foam.

(3) 13.7 parts of an acid albumen degradation product of 100 per cent. strength and 20.8 parts of a paste of 75 per cent. strength prepared from butylated naphthalene-sulfonic acid are mixed with 36 parts of water and neutralized with 6.7 parts of an ammonia solution of 25 per cent. strength. This mixture is liquefied by the addition of 8.5 parts of glycol and 3.4 parts of ethyl-polyglycol. A solution of 2 per cent. strength of this product yields per part by volume, when transformed into a foam in an apparatus sucking in air on the principle of the ejector under a pressure of 8 atmospheres, 12.2 parts by volume of foam.

We claim:

1. A new composition of matter, liquid at ordinary temperature and miscible with water even at a temperature near the freezing point of the water, yielding with water and air a fire-extinguishing foam stable to heat, the said composition comprising a highly concentrated solution of at least 13 per cent. of a wetting agent, 20 per cent. or more of an albumen degradation product, and 50 to 60% of a mixture of water and a hydrophylic solvent.

2. A new composition of matter, liquid at ordinary temperature and miscible with water even at a temperature near the freezing point of the water, yielding with water and air a fire-extinguishing foam stable to heat, the said composition comprising a highly concentrated solution of at least 13 per cent. of a wetting agent, 20 per cent. or more of an albumen degradation product, and 50 to 60% of a mixture of water and a water-soluble alcohol.

3. A new composition of matter, liquid at ordinary temperature and miscible with water even at a temperature near the freezing point of the water, yielding with water and air a fire-extinguishing foam stable to heat, the said composition comprising a highly concentrated solution of at least 13 per cent. of an alkylated aromatic sulfonic acid, 20 per cent. or more of an albumen degradation product, and 50 to 60% of a mixture of water and a water-soluble alcohol.

4. A new composition of matter, liquid at ordinary temperature and miscible with water even at a temperature near the freezing point of the water, yielding with water and air a fire-extinguishing foam stable to heat, the said composition comprising a highly concentrated solution of at least 13 per cent. of butylated naphthalene-sulfonic acid, 20 per cent. or more of an albumen degradation product, and 50 to 60% of a mixture of water and ethyl-poly-glycol.

KARL DAIMLER.
MAX PAQUIN.
WALTER RIEDELSBERGER.